United States Patent [19]
Wachter et al.

[11] 3,861,216
[45] Jan. 21, 1975

[54] MEASURING DEVICE HAVING MEANS FOR APPLYING A SELECTED PRESSURE TO A MEASURED VESSEL

[75] Inventors: Karl-August Wachter, Lubeck; Horst Rabenecker, Bad Schwartau, both of Germany

[73] Assignee: Dragerwerk Aktiengesellschaft, Lubeck, Germany

[22] Filed: Aug. 16, 1972

[21] Appl. No.: 281,181

[30] Foreign Application Priority Data
Aug. 19, 1971 Germany............................ 2141496

[52] U.S. Cl............................... 73/421.5, 23/254 R
[51] Int. Cl.............................................. G01n 1/24
[58] Field of Search....................... 73/23, 28, 421.5; 23/254 R, 254 E, 255 R, 255 E, 256; 222/3, 6

[56] References Cited
UNITED STATES PATENTS
1,953,061  4/1934  Blackwood..................... 73/421.5 R
2,527,136  10/1950  Kagi et al............................ 222/57
3,446,600  5/1969  Wachter et al................ 73/421.5 R

*Primary Examiner*—S. Clement Swisher
*Attorney, Agent, or Firm*—McGlew and Tuttle

[57] ABSTRACT

A measuring device comprises a connection mount for holding a measuring vessel, such as an open ended test tube on a connection of the mount which connects to a pressure chamber through a reversing valve. The reversing valve is also connected to a pump, such as a vacuum pump, to evacuate the pressure chamber. At least one pressure sensing device is connected to the chamber and to the reversing valve for selectively and alternately connecting the chamber to either the mount for communicating the pressure of the chamber to the measuring vessel or to the pump for communicating the chamber to the pump for evacuating the chamber.

5 Claims, 1 Drawing Figure

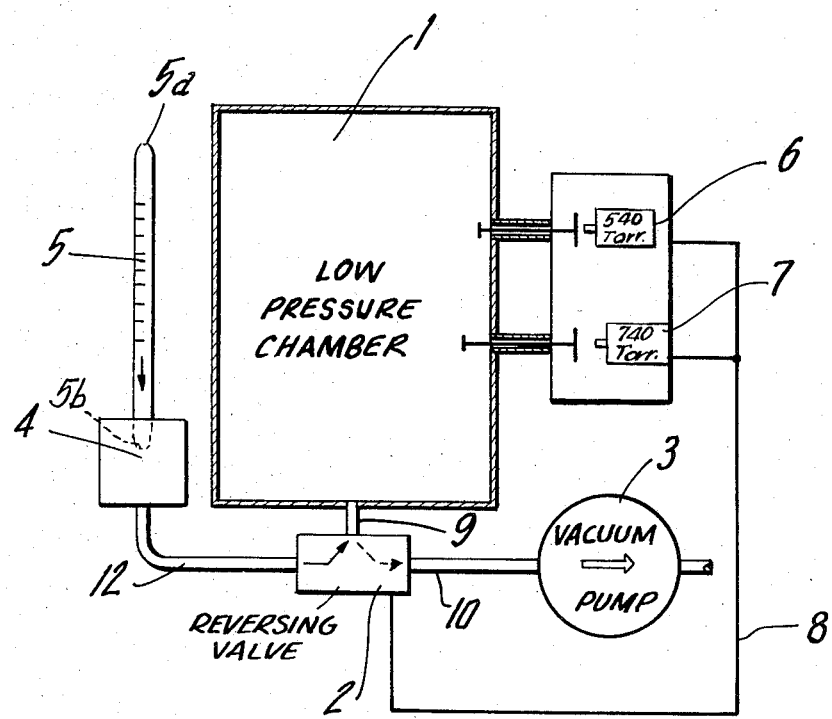

3,861,216

MEASURING DEVICE HAVING MEANS FOR APPLYING A SELECTED PRESSURE TO A MEASURED VESSEL

BACKGROUND OF THE INVENTION

1. Field of the Invention

This invention relates in general to measuring devices and, in particular, to a new and useful gas detecting or dust detecting measuring device, in which the measuring vessel is selectively connected to a pressure chamber, particularly a low pressure chamber.

2. Description of the Prior Art

A device for detecting foreign gases or suspended matter in air is known, where the air is sucked through a re-agent vessel by means of an air conveyor. Such a device includes a bellows for applying a suction pressure to the vessel, and it is mounted so that it is urged by a spring into its expanded end position, with the expansion being effected by the spring force in order to convey the air. The expansion of the bellows is limited by the length of locking bands. In addition, the bellows can be provided with only one outlet valve, and the air resistance of the suction port can be greater than the resistance of the outlet valve. Because of the nature of this suction apparatus, a defined amount of work is sucked during each working stroke through the re-agent vessel at a rate varying with the time. The vessel for such an apparatus usually comprises an opened end test tube. The suction rate depends on the resistance of the test tube and on the spring force of the driving spring. In order to operate such a device, it is necessary, in most cases, to operate the bellows manually by hand in order to convey a certain amount of air, and this causes operator fatigue so that the time intervals between the individual working strokes are not exactly constant and this can influence the measuring result.

A similar device is known, which comprises a gas detecting or dust detecting and measuring device which includes a bellows pump with a moving part arranged in the range of a motion of a pressure plate which is moved backwardly and forwardly by a drive, for example, by a clockwork mechanism connected to an electric motor. Such a mechanism must be operated at a velocity which is greater than the moving bellows during the working stroke of the bellows pump. In addition, the drive is controlled so that the pressure plate is moved backwardly and forwardly over a full moving stroke, but it stands still in the further course of the working stroke of the bellows pump in one end position. A spring-loaded gas detecting pump of known design can also be used as an air conveyor. The bellows pump can be connected at its suction side to a conveyor measuring element, such as a pressure cell, which shuts off the drive in case of an underpressure of the suction side of the pump. The same device will operate to start the drive at normal pressure on the suction side of the pump. In another embodiment, a pressure measuring element, such as a pressure cell, is connected to the pressure side of the bellows pump to shut off the drive in case of an overpressure on the pump outlet side, and it starts the drive at normal pressure on the pump outlet side. Furthermore, a break contact can be arranged in the circuit of an electric drive which is controlled by a pressure cell provided on the suction side of the bellows pump and this break contact is opened at an underpressure on the suction side of the pump and closed at a normal pressure on the suction side. This device requires a powerful drive for its operation.

SUMMARY OF THE INVENTION

In accordance with the present invention, there is provided a gas detecting or dust detecting and measuring device which is equipped with an air conveyor which is not operated by hand and which is simple in design, and does not employ a bellows pump. The invention provides a measuring device where the air to be tested is sucked by means of an air conveyor through a re-agent or measuring vessel such as a test tube. The invention includes a low pressure chamber as a suction device, which is connected to one or several pressure indicators. The pressure indicators are connected selectively to a reversing valve which is interposed between the connection of the vessel to the pressure chamber and the connection of a vacuum pump to the pressure chamber. The individual pressure indicators have means for controlling the operation of the valve to shift the connection from the vessel to the measuring chamber to a connection in which the vacuum pump is connected to the measuring chamber or vice versa. The construction of the invention has the advantage that it has a very simple air conveyor in the form of the low pressure chamber and a vacuum pump arrangement is provided which does not require a bellows type pump, but which can be operated to achieve the same or better flow characteristics. During each working stroke, the gas to be tested is sucked into the test tube which is mounted on a connecting mount, and the conditions may be identical or better than the conditions which are present when a bellows is used for such operations.

The invention provides a simple arrangement in which the reversing valve is equipped with reversing means controlled by one or more pressure conditions which are sensed at the low pressure chamber. The automatically controlled reversing valve can be moved into a position when the pressure set on the pressure indicator drops below a certain value, in which event, the connection between the low pressure chamber and the measuring vessel is opened and the connection between the low pressure chamber and the vacuum pump is closed in order to apply a suction pressure to the measuring vessel to draw in the gas to be measured. The reversing valve is moved into another position when a predetermined higher pressure is exceeded on the pressure indicator, in which event, the connection between the low pressure chamber and the vacuum pump is opened and the connection between the low pressure chamber and the re-agent or measuring vessel is closed. The reversing valve is advantageously electrically controlled.

Accordingly, it is an object of the invention to provide a measuring device which includes a low pressure chamber which is selectively and alternately connected to a mounting for a test vessel and to a vacuum pump in accordance with pressure conditions which are sensed in the pressure chamber.

A further object of the invention is to provide a device which includes a reversing valve connection between a mounting for a test vessel and a low pressure chamber and between the low pressure chamber and a vacuum pump and this reversing valve is controlled by one or more pressure sensing devices which are connected to the low pressure chamber.

A further object of the invention is to provide a testing device which is simple in design, rugged in constuction, and economical to manufacture.

For an understanding of the principles of the invention, reference is made to the following description of a typical embodiment thereof as illustrated in the accompanying drawing.

BRIEF DESCRIPTION OF THE DRAWING

The only FIGURE of the drawing is a schematic representation of a measuring device constructed in accordance with the invention.

GENERAL DESCRIPTION OF THE PREFERRED EMBODIMENT

Referring to the drawings in particular, the invention embodied therein comprises, a low pressure chamber 1, which is connected through a common flow line 9 to a reversing valve 2.

In accordance with the invention, the reversing valve 2 is connected through a conduit 10 to a vacuum pump 3, and it is connected at its other end through a connecting line 12 to a test vessel mount or connection mount 4, having means therein for connecting the conduit 12 to a test vessel, such as a test tube 5, having opened ends 5a and 5b.

The low pressure chamber 1 is advantageously connected to at least one pressure indicator and, in this instance, two pressure indicators 6 and 7 are provided. The indicators 6 and 7 provide means for sensing the pressure in the low pressure chamber and for operating the reversing valve 2; and the indicator 6 is connected into an electrical circuit 8 of a control device for the reversing valve 2 so that, when the underpressure which is set for example at 540 torr. drops below the valve of the setting, the reversing valve will open the connection between the mount 4 and the chamber 1. At the same time, the previously existing connection of the reversing valve between the low pressure chamber 1 of the vacuum pump 3 is closed off.

In the condition in which the valve 2 communicates the mount base 4 to the pressure chamber 1, as indicated in solid lines by the arrow shown in the reversing valve 2, air will be taken in through the test tube 5. The pressure will rise in the low pressure chamber 1. The pressure indicator 7 is also connected to the electrical circuit 8, and it is advantageously set so that the reversing valve 2 is moved in its other position when a pressure of 740 torr. is achieved. This causes the interruption of the connection of the test tube 5 in the low pressure chamber 1 through the conduit 12 and the conduit 9, and establishes a connection between the conduit 9 and the conduit 10 to the vacuum pump 3. Thus, the device is completely automatic. The time intervals between the samplings, that is, the time intervals at which an underpressure of 540 torr. is generated in the low pressure chamber 1, will always be the same.

The apparatus can also be constructed so that the several parts which comprises the low pressure chamber 1, the mounting 4 for the test tube 5 and the reversing valve 2, can all be connected to a vacuum pump. This means that several measuring devices can be operated with the same vacuum pump 3. A portable device of this type is equipped with a battery and a battery charger operating the pump and the electrical control apparatus.

While a specific embodiment of the invention has been shown and described in detail to illustrate the application of the principles of the invention, it will be understood that the invention may be embodied otherwise without departing from such principles.

What is claimed is:

1. A measuring device, particularly for detecting gas and dust, comprising a connection mount having means for holding a measuring vessel and for applying a fluid pressure thereto, a pressure chamber connected to said mount for applying the fluid pressure to said mount, a pressure applying pump connected to said chamber, reversing valve means connected between said mount and said pump to said chamber, and at least one pressure sensing device connected to said chamber and to said valve for selectively and alternatively connecting said mount and said pump to said chamber at two pressure extremes.

2. A measuring device, according to claim 1, wherein said reversing valve is electrically controlled, said pressure sensing device comprising an electrically operated device connected to said reversing valve.

3. A measuring device, according to claim 1, wherein said pump comprises a vacuum pump for evacuating said chamber.

4. A measuring device, particularly for detecting gas and dust, comprising a connection mount having means for holding a measuring vessel and for applying a fluid pressure thereto, a pressure chamber connected to said mount for applying the fluid pressure to said mount, a pressure applying pump connected to said chamber, reversing valve means connected between said mount and said pump to said chamber, and at least one pressure sensing device connected to said chamber and to said valve for selectively and alternatively connecting said mount and said pump to said chamber, including two separate indicators for operating said reversing valve at two distinct pressure conditions of said pressure chamber, said reversing valve being connected to each of said pressure sensing devices and being operable by the respective settings of each to respectively interconnect said mount and said vacuum pump to said low pressure chamber.

5. A measuring device, according to claim 4, wherein one of said pressure sensing devices is set for a high pressure setting and the other of said pressure sensing devices is set at a low pressure setting, said reversing valve being operable by said indicators so that it is moved into a position when a pressure drops below a predetermined value to establish a connection between said pressure chamber and said vessel mount and to close the connection between said pressure chamber and said pump; said reversing valve being movable when a predetermined higher pressure set on the other pressure sensing device is exceeded in said chamber to open the connection between said chamber and said vacuum pump and to close the connection between said pressure chamber and said mount.

* * * * *